United States Patent [19]

Hässler

[11] Patent Number: 4,838,915

[45] Date of Patent: Jun. 13, 1989

[54] METHOD FOR HEATING THICK-WALLED GLASS TUBES AND APPARATUS THEREFORE

[75] Inventor: Yngve Hässler, Lidingö, Sweden

[73] Assignee: Stiftelsen Institutet for Mikrovagsteknik vid, Stockholm, Sweden

[21] Appl. No.: 120,782

[22] Filed: Nov. 16, 1987

Related U.S. Application Data

[63] Continuation of Ser. No. 747,830, Jun. 24, 1985, abandoned.

[30] Foreign Application Priority Data

Jul. 3, 1984 [SE] Sweden ............................ 8403529
Jun. 3, 1985 [SE] Sweden ............................ 8502746

[51] Int. Cl.[4] .............................................. H05B 6/78
[52] U.S. Cl. ............................................ 65/2; 65/12;
65/29; 65/102; 65/274; 65/269; 65/292;
65/162; 219/10.55 M; 219/10.55 A
[58] Field of Search .................... 65/3.11, 3.12, 18.2,
65/29, 144, 2, 12, 108, 102, 271, 274, 269, 292,
162; 219/10.55 A, 10.55 R, 10.55 M, 10.55 C;
118/715, 718

[56] References Cited

U.S. PATENT DOCUMENTS

| | | | |
|---|---|---|---|
| 4,090,055 | 5/1978 | King | 65/12 |
| 4,144,434 | 3/1979 | Chiron | 219/10.55 A |
| 4,145,456 | 3/1979 | Kuppers et al. | 65/3.12 |
| 4,292,063 | 9/1981 | Abe | 65/3.12 |
| 4,405,655 | 9/1983 | Tuin | 65/3.12 |
| 4,417,911 | 11/1983 | Candy et al. | 65/3.12 |
| 4,446,348 | 5/1984 | Huang et al. | 219/10.55 R |
| 4,477,707 | 10/1984 | Kim | 219/10.55 R |
| 4,718,929 | 1/1988 | Power et al. | 65/3.12 |
| 4,760,230 | 7/1988 | Hassler | 219/10.55 A |

FOREIGN PATENT DOCUMENTS 0072069 2/1983 European Pat. Off. ............ 65/3.12

Primary Examiner—Kenneth M. Schor
Attorney, Agent, or Firm—Nies, Webner, Kurz & Bergert

[57] ABSTRACT

A method for heating thick-walled glass tubes, particularly quartz tubes, in the manufacture of optical fibres while using microwave energy. According to the invention, the tube (5) is pre-heated to a temperature of about 1000° C.–1500° C., preferably in a known manner with the aid of a gas flame, whereafter the tube is further heated by means of microwave energy, generated by a microwave generator, by inserting the tube (5) axially into a microwave cavity (2) incorporating in both end walls (6,7) or end surfaces openings (3,4) for the tube (5), the electrical field strength being given a field image which includes only one tangential component, according to TE-01n-mode, preferably according to the mode TE-011, whereby the electrical field is so formed as to be tangential to the surfaces of the tube (5), and so formed that the electrical field strength is zero adjacent the surfaces of the cavity (2). The invention also relates to apparatus for carrying out the method.

24 Claims, 2 Drawing Sheets

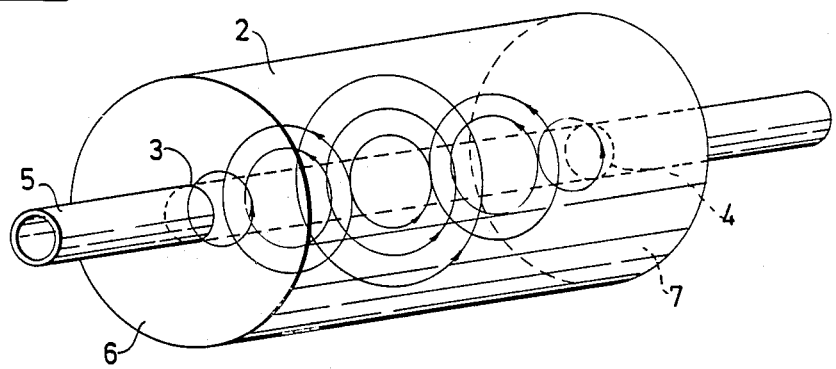
Fig_1
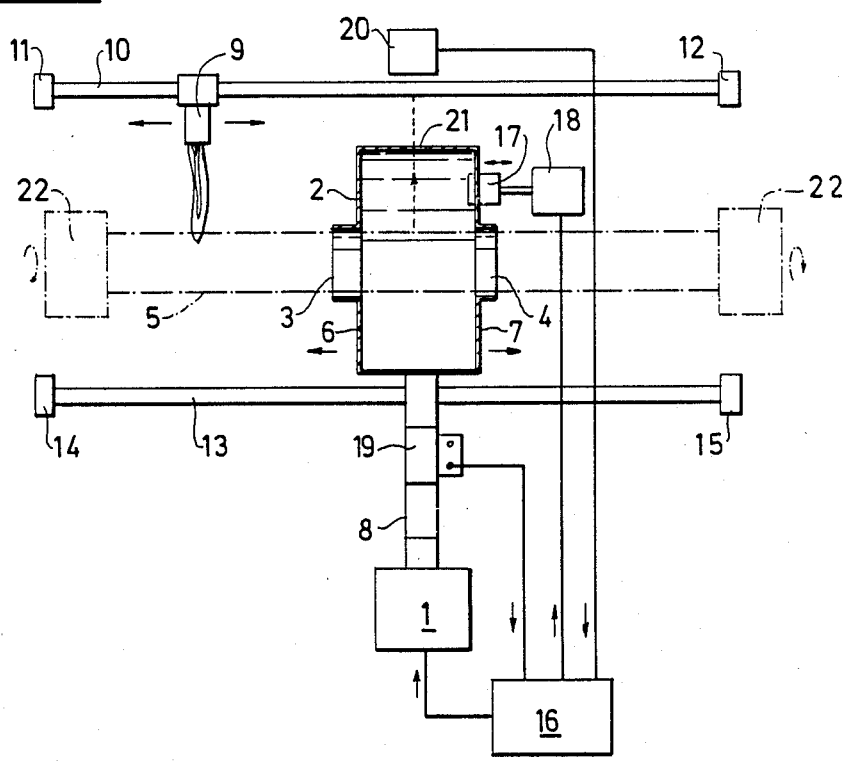
Fig_2

METHOD FOR HEATING THICK-WALLED GLASS TUBES AND APPARATUS THEREFORE

This application is a continuation of application Ser. No. 747,830, filed June 24, 1985, now abandoned.

BACKGROUND OF THE INVENTION

The present invention relates to a method and apparatus for heating thick-walled glass tubes, particularly quartz tubes intended for the manufacture of optical fibres.

One known method of manufacturing optical fibres is based on the use of a glass tube. A layer of pure quartz, $SiO_2$, is deposited on the inner wall of the tube. Germanium dioxide $GeO_2$ is also deposited in given layers as a doping agent.

This is effected by introducing silicon tetrachloride $SiCl_4$, and free oxygen $O_2$, into the tube, together with germanium tetrachloride, $GiCl_4$. Silicon dioxide and germanium dioxide and herewith deposited on the inner walls of the tube. In order for these reactions to take place, it is necessary to heat the interior of the tube to a temperature of about 1400° C. This is normally achieved by passing a burner along the length of the tube, while rotating the tube abouts its axis. Firstly, silicon tetrachloride, $SiCl_4$, and oxygen, $O_2$, are introduced, whereupon silicon dioxide is deposited and forms a porous layer. When the burner passes over the porous layer, the layer sinters to form a transparent silicon dioxide. This deposition process, is repeated, whereafter germanium tetrachloride is mixed with the silicon tetrachloride gas, so as to develop a correct so-called index profile. Normally, from 30 to 100 layers are applied in the deposition phase. Upon completion of the deposition phase and sintering phase, the temperature of the burner is raised, so as to heat the tube to about 2200° C. At this temperature the surface tensions created cause the tube to draw together, i.e. to collapse. Subsequent to traversing the tube a few times with the burner, the tube forms a rod, i.e. a so-called preform, from which an optical fibre can be drawn.

One known method of increasing the speed of the process during the deposition phase is to transmit high frequency energy with the aid of a coil wound around the tube, for example energy having a frequency of 3-4 MHz, there being formed within a tube a plasma having a temperature of about 10,000° C.

It is necessary to follow the coil with a burner, in order to sinter the deposited material.

Another known method is one in which the pressure within the tube is lowered to about 10 mbar and a microwave energy field is applied to generate arcing in the gas present in the tube, therewith to form a low-temperature plasma without heating the tube directly with microwave energy.

In order to maximise production, it is desired to shorten the time taken to effect each part process, i.e. deposition, sintering, and tube collapse, and to increase the size of the preform so as to reduce the influence of the apparatus set-up times. An obvious way of producing larger preforms is to begin with larger and bigger tubes. However, when larger tubes are used it is difficult to achieve a stable collapse and a proportional increase in the collapse time, because quartz glass is a remarkably poor conductor. In order to achieve a collapse, it is necessary to heat the tube uniformly to a temperature of about 2200° C.

In all known processes the tube is heated to the requisite temperature with the aid of a gas flame.

All methods are therefore contingent on the poor thermal conductivity of the glass.

SUMMARY OF THE INVENTION

This problem is solved fully by means of the present invention, which provides a method for heating the glass tube rapidly and uniformly across its cross-section.

The present invention relates to a method and apparatus for heating the tube with the aid of microwave energy. The tube is heated herewith rapidly and uniformly across the cross-section thereof. Consequently no temperature gradient is required over the cross-section of the tube, in order to heat the tube from the outer surfaces thereof to the inner surfaces thereof. In known surface-heating processes this gradient can result in the outer tube-surface being heated to excessively high temperatures before the inner wall-surface of the tube reach the collapse temperature.

In addition, problems created by the dirtying effect of the gas flame and its pressure are avoided when practising the invention.

A problem exists, however, with apparatus for heating with microwaves a glass tube of the kind meant here.

The power developed in the material can be expressed as $$P_f = \frac{1}{2} \cdot \omega \cdot \epsilon \cdot \tan \delta \cdot \int_V E^2 \, dV$$

where $P_f$ is the power developed, $\omega$ is the angular velocity, $\epsilon$ is the dielectric constant, E is the electrical field strength, V is the volume and $\tan \delta$ is a measurement of the dielectric losses.

Glass has a low $\tan \delta$-value, and hence it does not receive sufficient energy. This low $\tan \delta$-value can be compensated for, by increasing the electrical field strength E. This is restricted, however, by what the atmosphere surrounding the tube is able to withstand before arcing occurs and a plasma is formed. In the aforementioned known methods of heating the interior of the tube with microwave energy, this arcing takes place in the internal gas atmosphere of the tube, such that said plasma is formed.

When heating quartz glass with microwave energy, the electrical field must not be generated with respect to form or magnitude such that electric arcing will take place at some point or another, i.e. ionization or plasma formation. Such arcing namely negates the possibility of converting the microwave energy directly to heat within the quartz glass.

As a result hereof it has not been possible hitherto to heat a quartz tube successfully with microwave energy.

The present invention relates to a method and apparatus with which a thick-walled quartz tube can be heated uniformly and electrical arcing can be avoided.

The present invention refers to a method for heating thick-walled glass tubes, particularly quartz tubes intended for the manufacture of optical fibers, while utilizing microwave energy, and is characterized by heating the tube, preferably with the aid of a gas flame in a manner known per se, to a temperature of about 1000° C.-1500° C., and by subsequently heating the tube with the aid of microwave energy produced by a microwave generator, by introducing the tube axially into a microwave cavity having tube-accommodating openings in the two end walls thereof, the electrical field strength being given a field image comprising solely one tangential component, according to a TE-01n-mode, (TE means transverse electrical) preferably according to the mode TE-011, whereby the electrical field is so formed as to be tangential with the tube surfaces and so formed that the electrical field strength is zero adjacent the surfaces of said cavity.

The invention also relates to apparatus of the kind having a fundamental characteristic features set forth in claim 11.

The present invention will now be described in more detail with reference to embodiments thereof illustrated in the accompanying drawings, in which

BRIEF DESCRIPTION OF THE DRAWING

FIG. 1 illustrates the field distribution in a cavity into which a quartz tube is inserted.

FIG. 2 is a block schematic of apparatus according to the invention.

DESCRIPTION OF THE INVENTIVE EMBODIMENTS

Figure 3:
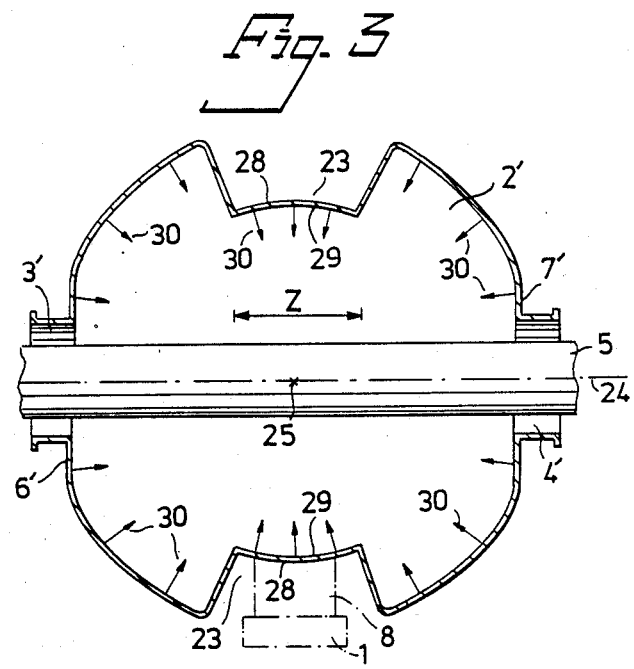
FIG. 3 is a schematic sectional view of a cavity according to the invention.

FIG. 2 illustrates apparatus according to the invention. The illustrated apparatus arrangement includes a microwave generator 1, preferably constructed to generate microwave energy of a frequency of 2450 MHz. The arrangement also includes a microwave cavity 2;2' incorporating a metal cavity having holes 3,4; 3',4' located centrally therein for introduction of a glass tube 5 into the cavity, through its two side surfaces 6,7; 6',7' or end surfaces. The microwave generator is connected to the cavity 2 via a waveguide 8 which includes an isolator. The arrangement also includes apparatus for preheating a glass tube 5, this apparatus incorporating known means hereof. According to one embodiment there is used a gas burner 9, which is arranged to traverse along the glass tube 5 on a guide 10, such as a driven screw-feed device journalled at 11,12. Alternatively, a layer can be applied to the tube which has high dielectric losses, to enable the tube to be preheated with microwave energy.

The microwave cavity 2;2' and associated equipment are also arranged to traverse along the glass tube 5, on a guide 13, such as a driven screw-feed device journalled at 14,15.

A control unit 16 is provided which, according to one embodiment, is arranged to control a mechanical means, such as a dielectric body 17 which can be moved into and out of the cavity 2;2' by means of a servo-device 18, for example a servomotor, and which is arranged to thereby adjust the resonance frequency of the cavity 2 when said cavity is loaded with a glass tube 5, so that the resonance frequency of the cavity becomes equal to the frequency of the microwave generator. In addition to the geometric shape of the cavity, the relevant resonance frequency is also dependent on the geometry of the glass tube and its temperature.

In accordance with a further embodiment, the control unit 16 is adapted to control the frequency of the microwave generator 1, so that said frequency is equal to the resonance frequency of the cavity when said cavity is loaded with a glass tube.

The real value of the control unit comprises a signal obtained from a directional coupler 19, which is connected between the microwave generator and the cavity. The signal produced by the directional coupler 19 corresponds to the amount of power reflected in the cavity 2;2'. Respective frequencies are adjusted by controlling the device 17,18 or alternatively the frequency of the microwave generator, so that the resonance frequency of the cavity when loaded is equal to the frequency of the microwave generator. The criterion in this respect is that the reflected power shall be minimized.

When heating a glass tube for the purpose of manufacturing optical fibres, which tube is intended to collapse, it is necessary to accurately control the temperature. To this end there is provided a temperature sensor, which is located adjacent to or in the cavity 2;2' and arranged to send a signal to the control unit 16 corresponding to the temperature of the glass tube 5.

Preferably, a device 20 sensitive to infrared radiation is placed externally of the cavity 2;2', this device being irradiated by the tube through an aperture 21 in the surrounding wall of the cavity.

The control unit is also adapted to control the power output of the microwave generator 1, in dependence on said temperature and on set-point values introduced into the control unit.

The glass tube 5 is suitably mounted in a so-called glass-turning device 22, arranged to rotate the glass tube about its axis.

The microwave generator 1 is connected to the cavity in a manner such that the electrical field strength will only include one tangential component, cf. FIG. 1, according to a TE-01n-mode. Preferably there is chosen the mode TE-011, which results in the electric field having solely one variation in Z-direction, i.e. a direction parallel with the longitudinal axis of the cavity. In this way, the electrical field will be so formed as to be tangential to the surfaces of an inserted quartz tube 5, and so formed that the electrical field strength is zero in the proximity of the cavity surfaces.

When this mode is applied, the electrical field hangs freely in the air and is zero at every location in the metal.

The field lines of the electric field have been shown in FIG. 1, partly to illustrate their tangential direction and partly to show that the field has a maximum centrally between the two side surfaces 6,7 of the cavity. The field has a minimum at the centre surface or circumferential surface of the cavity and a maximum of half the radius.

This mode prevents arcing from being initiated, either at the metal surfaces of the cavity or adjacent the holes 3,4. The holes have no appreciable effect on the field pattern and no field concentrations are formed in the region of the holes.

Thick-walled glass tubes enable an electrical field to be obtained which has a high value within the glass and a low value externally thereof. The use of thick-walled glass tubes not only affords an advantage from the aspect of manufacture but also means that the glass tube, subsequent to being pre-heated, will cool more slowly than will a thin-walled glass tube.

An advantage is gained when subpressure in the atmosphere surrounding the glass tube is not utilized, since this would greatly facilitate arcing. Atmospheric pressure has been found suitable.

By constructing the apparatus in the aforedescribed manner and selecting a TE-01n-mode, arcing is avoided to a substantial extent. Thus, the field strength E according to the above formula can be greatly increased, without arcing occurring.

According to the present method, the glass tube is first pre-heated with the aid of a known device, such as a gas burner, to a temperature of about 1000° C.–1500° C.

The dielectric losses in glass namely increase considerably from room temperature up to 1000° C.–1500° C. Thus, the factor tan δ increases considerably, while at the same time the electrical field strength can be increased without arcing occurring, due to the shaping of the field, enabling the glass tube to be advantageously heated with the aid of microwave energy at a temperature of 1000° C.–1500° C.

In accordance with a first embodiment the microwave cavity is of cylindrical configuration and is made of metal, and is provided, as beforementioned, in its two side surfaces 6,7 with openings through which the tube to be heated is axially inserted, cf. FIG. 1.

The possibility of supplying power to the cavity such as to obtain a high tube temperature without, at the same time, causing electric arcing, is limited, however.

This limitation is due partly to the fact that a large quantity of heat is conducted away from the heated tube, and partly to the fact that when traversing the cavity relative to the tube the hot part of the tube is displaced towards one end of the cavity, the electrical field being used to heat already heated tube material to a greater extent than otherwise desirable. Consequently, it is difficult to supply a sufficiently high power to the centre of the cavity, i.e. the location at which that part of the tube to be heated is found, without electric arcing occurring.

Because of this the microwave cavity according to a further preferred embodiment is provided in its centre part with a constriction which extends in a sectional plane through its longitudinal axis extending through said openings, so that the radial distance from the geometric centre of the cavity to the cavity wall is shorter at the location of the restriction than at both sides thereof. This embodiment is based on the insight that a relationship exists between the temperature of the quartz tube and the maximum power, $P_{max}$, which can be supplied to the cavity without electric arcing taking place, which relationship can be expressed as $$P_{max} \sim 1/T^2$$

where T is the absolute temperature.

Consequently, less power must be supplied to the cavity when the tube has a high temperature. Since a quartz tube of high temperature naturally requires an increase in power input, the result is that only a given maximum tube-temperature can be achieved for a given cavity. Consequently, if further power is supplied in order to increase the tube temperature, arcing will occur.

The cavity 2' of this embodiment is also coupled to the microwave generator via a waveguide, so that the electrical field strength will only include one tangential component according to TE-01n-mode, preferably the TE-011-mode, whereby the electrical field is so formed as to be tangential to the surfaces of a tube, and so formed that the electrical field strength is zero adjacent the cavity surfaces, as with the aforedescribed cylindrical cavity.

The aforesaid TE-01n-mode and the TE-011-mode are modes as defined in cylindrical cavities. It has been found, however, that these modes best describe the mode prevailing in the cavity according to FIG. 1, even though the modes are distorted somewhat when the cavity is not cylindrical.

The connection of the microwave generator 1 by means of the waveguide 8 is only illustrated as a schematic example. This coupling can be adapted to any cavity form by those skilled in this art.

FIG. 3 illustrates a microwave cavity 2' according to said further embodiment, which is arranged to be supplied with microwave energy from the schematically illustrated microwave generator 1. The cavity 2' incorporates centrally located openings 3', 4' intended for passage of a tube 5 in the opposite side surfaces 6', 7' or end surfaces of the cavity 2'.

That which has been said above with reference to the description of FIG. 2 also applies when utilizing the cavity 2'.

The cavity 2' has a peripherally extending constriction 23, seen in the section illustrated in FIG. 3, this section extending through the longitudinal axis of the cavity 2', said axis extending through said openings 3', 4'. The constriction 23 is located in the central part of the cavity. At the location of the constriction the radial distance from the geometric centre 25 of the cavity to the cavity wall is shorter than at the locations of both sides of the constriction 23.

The cavity is also so formed as to be axially symmetrical around said longitudinal axis 24.

The cavity is spherical, or substantially spherical with the exception of the location of the constriction 23, as evident from FIG. 1.

Figure 4:
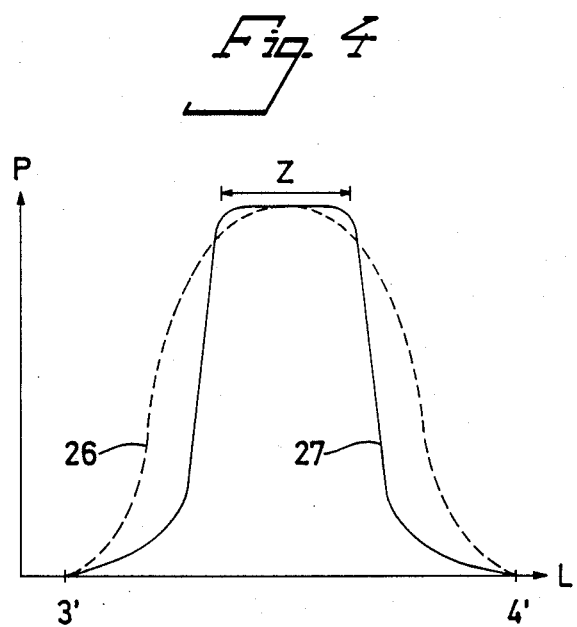
FIG. 4 illustrates schematically a full-line curve relating to thermal power developed per unit volume of a tube in the cavity plotted against the length of the cavity, when various cavities are used.

FIG. 4 illustrates curves representative of the thermal power developed per unit volume (P) of a tube at present in the cavity, along the length (L) of said cavity. The respective positions of the openings 3',4' are identified by the numerals 3' and 4' in FIG. 4.

When the aforesaid cylindrical cavity 2 which lacks the constriction 23 is used, a power distribution P according to the broken-line curve 26 is obtained. Thus, such a cavity provides a power distribution which is relatively dispersed over the length of the cavity, and with a short maximum in the direction of the longitudinal axis of the cavity. When heating a glass tube, the cavity is traversed along the tube, so that the heated, hot part of the tube 5 is moved along the tube. Because of the poor thermal conductivity of the glass, the temperature is distributed slowly in the longitudinal direction of the tube. Thus, when the cavity 2 has traversed a short distance in relation to the tube 5, that part of the heated, hot part of the tube displaced outside a desired heating zone Z in the cavity will still be heated to a large extent, when the power distribution is that illustrated by the curve 26, because the value of the power P is also high immediately outside the zone Z. As a result, a large part of the power input will be used to heat an already heated part of the tube 5.

Because, as beforementioned, the total power supplied to the cavity must be limited in order to prevent electrical arcing, it is difficult to supply a sufficiently high power to insufficiently heated parts of the tube in the zone Z, since a large part of the power input is supplied to the tube parts located outside the zone Z.

Since the dielectric losses of glass increase considerably with temperature, the power supplied is converted into heat at mainly the hot parts of the tube.

Thus, it is a matter of utilizing the supplied power so that said power is converted to heat to the greatest extent possible in that part of the tube to be heated.

Consequently, it is to the utmost advantage to produce, instead, a power distribution P according to the full-line curve 27 in FIG. 2, exhibiting a flat maximum in the zone Z and rapidly falling values on both sides of said zone.

The curve 27 is produced by means of the aforedescribed cavity 2'. The result of the constriction 23 is namely to concentrate the electrical field strength inwardly of the said construction, in a manner such that the maximum of the electrical field strength is forced in towards the centre of the cavity, and is therewith higher in that part of the glass tube located within the zone Z than in those parts of the glass tube located outside said zone. The length of the zone Z thus corresponds to the axial length of the constriction 23.

It will be obvious that when using this cavity parts of the glass tube which have already been heated will be further heated to a much lesser extent outside the zone Z than in the case when a cylindrical cavity 2, giving rise to the curve 26, is used. Thus, in this way a greater part of the power supplied will be converted to heat in that part of the tube being heated in the zone Z. As a result of this concentration of the power supplied it is possible to decrease the total power input in comparison with the power input required when a cavity producing curve 26 is used. As a consequence hereof it is possible to avoid electric arcing even when the temperature increases to high values. Naturally, a curve which in FIG. 4 has flanks which are parallel with the P-axis is sought for, although such a curve cannot be obtained in practice.

In accordance with one preferred embodiment, the extension of the aforesaid constriction 23 in the direction of said longitudinal axis is ¼ to ½ of the average diameter of the cavity.

In order to achieve extremely high temperatures more readily, for example temperatures of 2200° C., without needing to supply power of such magnitude that arcing will occur, the cavity wall 28 has in the location of said constriction an inner surface 29 of circular-arcuate configuration, the centre of which coincides with the geometric centre 25 of the cavity 2'.

According to one preferred embodiment, the cylindrical cavity 2, or the inner surface of the walls of the spherical cavity 2', are highly polished or coated with a highly reflective material which is inert to gases entering the cavity and which will not undergo any form of chemical conversion at the prevailing temperatures of the cavity walls. Gold is a material preferred in this respect, although any other suitable material can be used.

Consequently, particularly when the cavity is spherical or substantially spherical, the inner surfaces of the cavity will effectively reflect heat radiation 30 emitted by the tube and focus this radiation towards the centre 25 of the cavity, or in all events towards the zone Z. Such an embodiment has been found particularly effective, it being possible to reduce the total power input considerably in achieving high temperatures.

The advantages gained by heating thick-walled glass tubes with the aid of microwave energy in order to collapse the tubes are obvious. By heating with microwave energy, the tube is heated uniformly along the whole of its length, and hence the temperature is substantially constant throughout the whole of the tube. When the whole of the tube reaches the collapse temperature, about 2200° C., the tube will collapse.

In addition to avoiding overheating of the outer surface of the tube, the combined influence of a gas flame and its pressure is also avoided. Because of the poor thermal conductivity of glass, considerable time is taken to heat the glass to a collapse temperature with the aid of a gas flame. When heated by means of microwave energy the tube will reach the collapse temperature much more quickly than when heating with a gas flame.

The microwave cavity traverses along the glass tube during the heating stage.

In order to obtain the efficiency desired, coupling of energy into the cavity must be adapted in a known manner according to the so-called Q-value of the cavity.

In the case of a cavity provided with a hot glass tube, the Q-value is almost exclusively dependent on the geometry and temperature of the tube. Consequently, the cavity and energy connection should be adapted in a known manner to the dimensions of those tubes to be heated in the apparatus.

Although the above description has been given solely with respect to the collapsing of a glass tube, it will be understood that the invention can also be applied, inter alia, to the preceding sintering phase.

The present invention shall not be considered to be restricted to the aforedescribed embodiments, and it should be understood that modifications can be made within the scope of the following claims.

I claim:

1. A method for heating a thick-walled glass tube, in the manufacture of optical fibres while using microwave energy, comprising the steps of: pre-heating the tube (5) to a temperature of about 1000° C.–1500° C., and subsequently collapsing the tube to a solid optical fibre preform by further heating the tube in a microwave cavity, having a longitudinal axis and confining wall surfaces with at least two opposite surfaces having means defining openings therein enabling passage of the tube into and through the cavity, by means of microwave energy generated by a microwave generator (1), the subsequent heating including introducing the tube (5) axially into and coaxially along the longitudinal axis of said microwave cavity (2,2') to extend through said openings (3,4; 3',4') the electrical field strength in said cavity being given a field image which includes solely field lines which are concentric with the longitudinal axis of the cavity according to TE(transverse electrical)-01n-mode, whereby the electrical field is formed as field lines concentric to the surfaces of the tube (5) in the cavity, and so formed that the electrical field strength is zero adjacent the surfaces of the cavity such that arcing will not occur; said further heating being continued until the tube is collapsed into an optical fibre preform which can be drawn into an optical fibre.

2. A method according to claim 1, including the step of causing a constriction of the field image within the cavity by using a microwave cavity (2'), the cavity having located in its centre part, in a section through its longitudinal axis (24) extending through said openings (3',4'), a surface constriction (23), such that the radial distance from the geometrical centre (25) of the cavity to the confining wall surface of the cavity (2') is shorter at the location of the surface constriction (23) than on both sides of said surface constriction along the longitudinal axis.

3. A method according to claim 2, including the step of using a microwave cavity (2') which is substantially spherical, with the exception of the location of said cavity surface constriction (23).

4. A method according to claim 1, including use of a microwave cavity (2) which is of cylindrical configuration and made of metal.

5. A method according to claim 1, including use of a microwave cavity (2;2') in which the inner surfaces of the walls are coated with a highly reflective material which is inert to gases entering the cavity and which will not undergo any form of chemical conversion at the prevailing cavity-wall temperatures, said material being gold.

6. A method according to claim 1, including the step of mechanically adjusting the resonance frequency of the cavity (2;2') so that the resonance frequency of said cavity, when loaded with a tube (5), is equal to the frequency of the microwave generator (1).

7. A method according to claim 1, including the step of controlling the frequency of the microwave generator (1) with the aid of a control unit (16) in a manner such that the said frequency is equal to the resonance frequency of the cavity (2;2') when said cavity is loaded with a tube (5).

8. A method according to claim 1, wherein said TE-01n-mode is the TE-011-mode.

9. A method according to claim 1, wherein said step of pre-heating the tube to a temperature of about 1000° C.-1500° C. is by means of a gas flame.

10. A method according to claim 1, wherein said step of pre-heating the tube to a temperature of about 1000° C.-1500° C. is by microwave energy.

11. Apparatus for heating thick-walled glass tubes, in the manufacture of optical fibres, comprising: a microwave generator (1) and a microwave cavity having a longitudinal axis, said apparatus also including means, separate from said microwave cavity, for pre-heating a glass tube to a temperature of about 1000° C. to 1500° C., means for providing a glass tube, and means for maintaining said tube, within said cavity; wherein said cavity (2;2') incorporates centrally located means having oppositely arranged openings (3,4; 3',4'), for throughpassage of a tube (5), in opposite wall surfaces of the cavity along said axis; and wherein the microwave generator (1) is coupled to the cavity (2) via a waveguide (8), in a manner such that the electrical field strength will solely include field lines that are concentric to said longitudinal axis of the cavity according to a TE-01n-mode, whereby the electrical field is formed as field lines concentric to the surfaces of an inserted tube (5) in the cavity, and so formed that the electrical field strength is zero adjacent the cavity surfaces; the apparatus being structured such that said microwave generator will operate at only one frequency and said frequency and the shape of said waveguide and said cavity will ensure that a TE-01n mode is provided such that a glass tube will be collapsed in the absence of arcing.

12. Apparatus according to claim 11, wherein a constriction (23) is provided in the centre part of the microwave cavity (2') in a section through said longitudinal axis (24) extending through said openings (3',4'), such that the radial distance from the geometric centre (25) of the cavity to the wall of the cavity (2') is shorter at the location of the constriction (23) than on both sides of the constriction.

13. Apparatus according to claim 12, wherein the cavity (2') is substantially spherical, with the exception of the location of said constriction (23).

14. Apparatus according to claim 12, wherein the wall (28) of the cavity (2') at the location of said constriction (23) has an inner surface (29) which is of circular-arcuate configuration of the centre of which coincides with the geometric centre (25) of the cavity (2').

15. Apparatus according to claim 12, wherein said constriction (23) has an extension, seen in the direction of said longitudinal axis (24), which is $\frac{1}{4}$ to $\frac{1}{2}$ of the mean diameter of the cavity (2').

16. Apparatus according to claim 11, wherein said cavity is cylindrical and made of metal.

17. Apparatus according to claim 11, wherein
there is provided a control unit (16) adapted to control a mechanical means (17,18) intended for adjusting the resonance frequency of the cavity (2), said control unit (16) being arranged to control said means (17,18) in a manner such that the resonance frequency of the cavity (2), when a tube (5) is located therein, is equal to the frequency of the microwave generator (1).

18. Apparatus according to claim 17 wherein the real value of the control unit (16) comprises a signal obtained from a directional coupler (19), said signal corresponding to the amount of energy reflected.

19. Apparatus according to claim 11, wherein said microwave generator (1) frequency is equal to the resonance frequency of the cavity (2) when a tube (5) is present in said cavity.

20. Apparatus according to claim 12, wherein a temperature responsive mans (20), is located in or adjacent to the cavity (2), and is arranged to send to said control unit (16) a signal corresponding to the temperature of the tube (5), said control unit (16) also being arranged to control the microwave generator (1), with respect to its power, in dependence on said temperature.

21. Apparatus according to claim 12, wherein the inner surfaces of the walls of said cavity (2') are polished.

22. Apparatus according to claim 12, wherein the inner surfaces of the walls of said cavity (2') are coated with a reflective material which is inert to gases entering the cavity and which will not undergo any form of chemical conversion at the prevailing temperatures of the cavity walls.

23. Apparatus according to claim 22, wherein said reflective material is gold.

24. Apparatus as defined in claim 11, wherein said TE-01n-mode is the TE-011-mode.

* * * * *